May 6, 1941.    G. H. PHELPS    2,241,216
WELDING
Filed Aug. 17, 1939    3 Sheets-Sheet 2

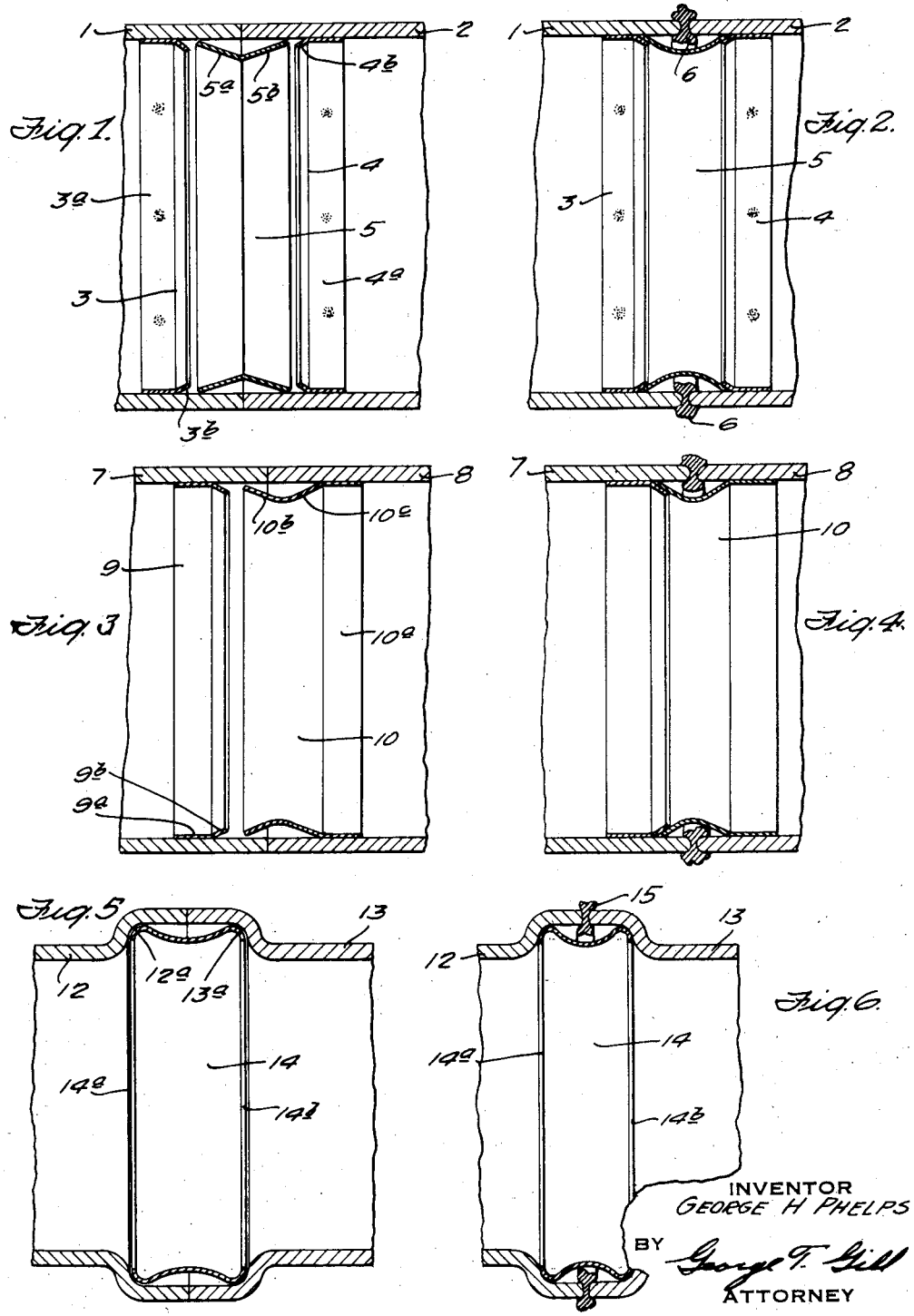

INVENTOR
GEORGE H. PHELPS
BY
George T. Gill
ATTORNEY

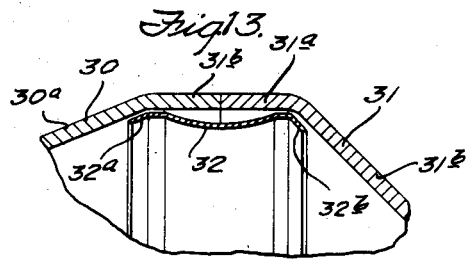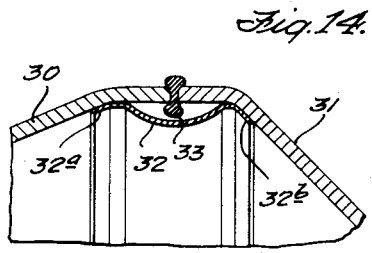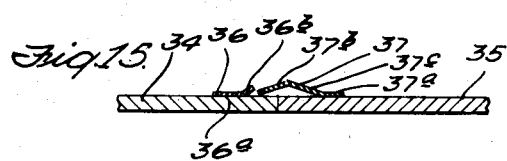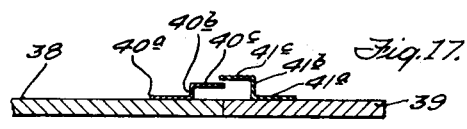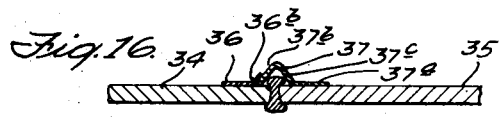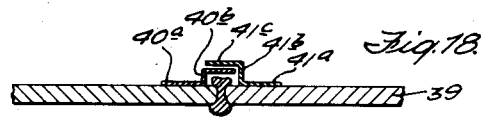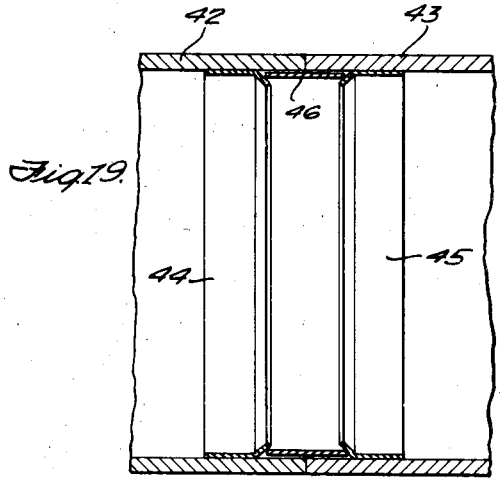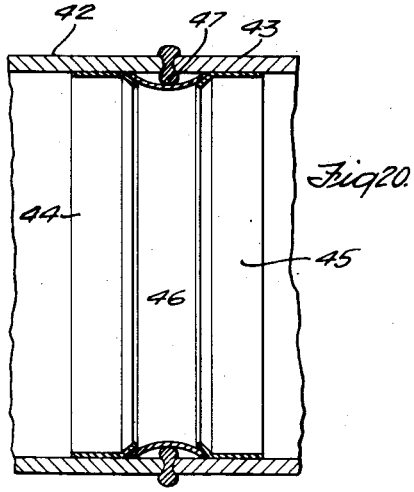

Patented May 6, 1941

2,241,216

UNITED STATES PATENT OFFICE 2,241,216

WELDING

George H. Phelps, Floral Park, N. Y., assignor to Metropolitan Engineering Company, Brooklyn, N. Y., a corporation of New York Application August 17, 1939, Serial No. 290,581

14 Claims. (Cl. 219—10)

The invention herein disclosed relates to a method of welding two pieces of metal together and confining the metal expelled at the joint, during the welding, in a limited, enclosed space; and the invention comprehends a welded article in which the metal extruded at the joint is permanently confined in a limited, enclosed space.

The invention is especially applicable to butt joints in which the weld is effected by either the electric resistance or the flash welding process. These welding processes are best adapted to the production of a large number of identical pieces and when so employed result in joints of highly uniform strength and dependability at a very low cost per weld. There has been, however, prior to the invention herein disclosed, a serious limitation to the use of these processes and to articles produced thereby. This limitation results from the formation of a flash or burr of extruded metal, more or less irregular in shape, along the joint. Particles of this flash or burr sometimes become detached from the main body of the metal and appear as a loose metallic grit. In many cases this necessitates the removal of the entire irregular or unsound portion of the burr even though great difficulty and expense are involved. This condition obtains most frequently in welding hollow articles such as tubing, stampings and forgings.

In consequence of the burr or flash, there were, prior to this invention, many cases in which advantage could not be taken of the speed and economy of the butt or flash welding processes; cases for example, in which the shape of the finished piece renders it impossible to remove the burr after welding and in which the presence of any easily loosened burr prohibits its use. Such conditions also exist, for example, in the welding of casings containing mechanical parts, bearings or the like, at the time of welding and in which the enclosed parts prevent the removal of loosely adhering particles of burr after welding. A particular example of this kind is the welding of casings for fluid coupling devices, for use in the transmission of torque, without rigid mechanical connections between the driven and the driving shafts.

By the method of this invention a butt weld is effected between two pieces of metal and the metal extruded at the joint is confined within a limited, permanently closed space. Thus, in a welded article, in which the weld is effected in accordance with the invention, particles that become detached from the burr are confined and there is no necessity to remove them. In accordance with one form of the invention a closure element such as a shield is arranged to overlap the joint between the pieces to be welded. With the closure element in place the weld is effected. Provision is made so that upon the weld being effected the closure element is secured permanently in place and forms, with the wall of the welded article, a limited, confined space in which the burr and any particles becoming detached therefrom are confined.

The material of which the closure element is made, the shape of the closure element and the manner of effectively securing it in place to effect, upon the completion of the weld, a confined, closed space may take many different forms. Several welded articles embodying the invention, and illustrating the method of the invention and various forms of closure shields are illustrated in the accompanying drawings. These several welded articles and the manner in which they are formed are described in detail below from which detailed description of the articles, and the method of welding as related to the articles, a clearer understanding of the invention may be had.

In the drawings:

Fig. 1 is a longitudinal section of a hollow article arranged to be welded;

Fig. 2 is a longitudinal section of the same article after the weld has been effected;

Fig. 3 is a longitudinal section of another hollow article ready for welding;

Fig. 4 is a longitudinal section of the same article after the weld has been effected;

Fig. 5 is a longitudinal section of a further hollow article arranged to be welded;

Fig. 6 is a longitudinal section of the same after the weld has been effected;

Fig. 13 is a fragmentary section of a hollow article of a special shape with the parts arranged and ready to be welded;

Fig. 14 is a fragmentary section of the same after the weld has been effected;

Fig. 15 is a sectional elevation of two plates arranged and ready for welding;

Fig. 16 is a section of the same plates after the weld has been effected;

Fig. 17 is a transverse sectional elevation of two plates arranged and ready for welding;

Fig. 18 is a sectional elevation of the same after the weld has been effected;

Fig. 19 is a fragmentary longitudinal section of a hollow article with the parts thereof arranged and ready for welding; and Fig. 20 is a longitudinal section of the same article after the weld has been effected.

Figure 7:
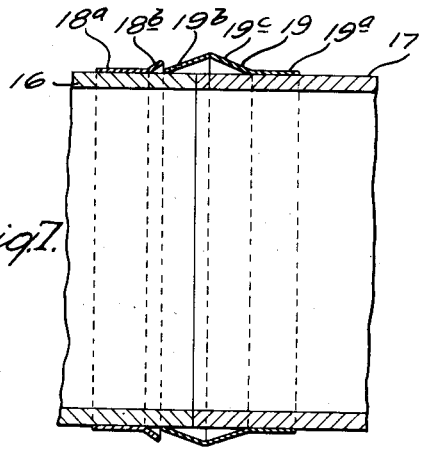
Fig. 7 is a longitudinal section of another hollow article arranged and ready for welding.

In butt welding two pieces of metal together by the resistance or flash processes of welding, the ends of the pieces to be joined are heated to a welding temperature and the two pieces of metal are then forced together. The heating is effected by an electric current that is caused to pass through the ends of the pieces to be welded. In the resistance process, the ends of the two pieces are brought together into contact and held together under pressure. The high resistance of these ends to the flow of a very high current causes a rapid heating of the adjoining ends of the two pieces to be welded. When the pieces have reached the welding temperature, they become softened and somewhat plastic to the extent that the metal flows or upsets at the pressure under which the welding is carried out. The heated ends are thus forced into each other, th length of the article being shortened accordingly and metal being extruded at the joint.

In the flash process, the heating of the ends of the two pieces to be welded is effected partly by their resistance to the flow of current but primarily by arcing between the ends. To secure the arcing condition, the ends of the two pieces just touch or are slightly separated. When the metal is brought to welding temperature, the two pieces are forced together under high pressure. The weld is thus effected, the welded article being slightly less in length than the combined lengths of the original pieces making up the article.

In Fig. 1 of the drawings, there is illustrated two tubular pieces 1 and 2 having the adjacent ends butted together, arranged and ready to be welded in accordance with this invention. On the piece 1, adjacent the edge thereof, there is secured an abutment 3 which consists of a ring of sheet metal and includes a flange 3a that is spot welded to the inner surface of the tubular piece 1 and an angularly disposed or frustroconical portion 3b. The frustroconical portion 3b converges toward the end of the tubular piece 1. A similar sheet-metal abutment 4 is secured to the tubular piece 2, the abutment 4 having a flange 4a spot welded to the piece 2 and a frustroconical portion 4b. Between the two abutments 3 and 4 there is placed a shield 5. This shield consists of a ring of sheet metal shaped to provide two frustroconical sections 5a and 5b converging towards the transverse center of the shield. Thus formed, the shield provides a bulge at the joint.

When the two pieces 1 and 2 are welded as heretofore described, they are arranged in the welding machine as shown in Fig. 1 with the shield in place between the abutments. As the two pieces are pressed together to effect the weld, the edges of the shield are forced under the frustro-conical sections of the abutments and securely wedged therebetween. The width of the shield is such that a firm tight seal is effected as illustrated in Fig. 2 in the welded article. The burr 6 formed by the metal extruded at the weld is completely and permanently confined within the space between the shield 5 and the wall of the welded article. A tubular or hollow article so welded may be used for any purpose, including the confining fluids, without fear of the contents being contaminated by grit or particles that may become loosened from the burr.

A similar pair of hollow pieces 7 and 8 ready to be welded are illustrated in Fig. 3. In the arrangement illustrated in Fig. 3 an abutment 9 is secured to the piece 7. This abutment has a flange 9a that is spot welded to the tubular piece 7 adjacent the end to be welded and a converging portion 9b. To the piece 8 a shield 10 is secured. This shield is provided with a flange 10a that is preferably spot welded to the inner surface of the piece 8 adjacent the end thereof to be welded. The shield proper includes two portions 10b and 10c converging towards the transverse center and it is arranged such that the free end thereof will engage under the frustroconical portion 9b of the abutment 9 when the weld is effected.

The article resulting from effecting the weld between the pieces 7 and 8 is illustrated in Fig. 4. It will be observed that the end of the section 10b of the shield 10 is securely and tightly wedged under the frustroconical portion 9b of the abutment 9. This arrangement also provides a permanent enclosure for the burr 11 formed upon effecting the weld.

The ends to be welded together of two tubular pieces 12 and 13 are illustrated in Fig. 5. In this instance the tubular piece 12 has been shaped to form an abutment shoulder 12a by enlarging the diameter of the end of the tubular piece. A similar shoulder 13a has been formed on the piece 13. These shoulders 12a and 13a form abutments for a shield 14 that is inserted between the shoulders. The shield bulges inwardly in a smooth curve and has curved flanges 14a and 14b which are arranged to be engaged by the shoulders 12a and 13a. When the pieces are arranged and ready for welding there is preferably a slight clearance between the curved flanges 14a and 14b of the shield 14 and the shoulders 12a and 13a. Also, the pieces are arranged and ready for welding there is preferably a slight clearance between the curved flanges 14a and 14b of the shield 14 and the shoulders 12a and 13a. Also, the flanges 14a and 14b are preferably coated with a lacquer or otherwise prepared to be electrically insulated from the pieces 12 and 13. This is to avoid the passage of current through the shield during the welding operation. While the current used in welding is very high, the voltage is very low and any electrical insulation is sufficient to insulate the shield.

The welded article resulting from effecting a butt weld between the pipes 12 and 13 is illustrated in Fig. 6. It will be seen that the flanges 14a and 14b are wedged against the shoulders 12a and 13a making a tight joint therewith. Between the shield and the outer wall, the burr 15 is confined within the limited space provided by the shield.

Figure 8:
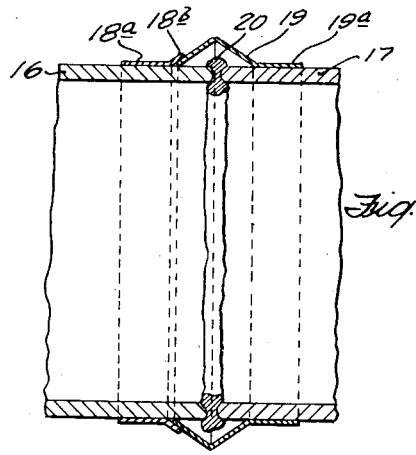
Fig. 8 is a longitudinal section of the same after the weld has been effected.

In the articles described above, the shield has been placed within a hollow article to confine the burr that is extruded inwardly. Normally it is possible, without too great expense to grind away the burr on the outside of an article. However, in certain instances, it is desirable to confine the burr on the outside of the article. Thus, in Figs. 7 and 8 there is illustrated an arrangement for confining the burr that is extruded outwardly of a hollow tubular article. The article consists of two tubular pieces 16 and 17. To the piece 16 there is secured an abutment which includes a flange 18a that surrounds and is spot welded to the piece 16 adjacent the end thereof to be joined. The abutment also includes a diverging frustroconical section 18b. To the piece 17 the shield 19 is secured. This shield has a flange 19a that surrounds and is spot welded to a tubular piece 17. The shield proper includes sections 19b and 19c which diverge towards the transverse center of the flange. With the pieces positioned as shown in Fig. 7 and the shield in place as indicated, the weld is effected and the operation results in the article illustrated in Fig. 8. As will be seen, the weld results in an article on which the shield 19 is on the outside of the article and forms with the exterior surface of the article a pocket in which the burr 20 is confined. Obviously, both an exterior and interior shield may be used on the same article so that the outwardly and inwardly extruded burrs are confined.

Figure 9:
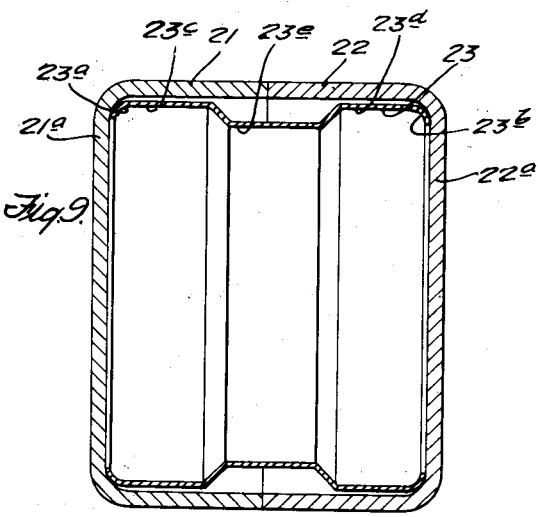
Fig. 9 is a longitudinal section of another such article arranged and ready for welding.
Figure 10:
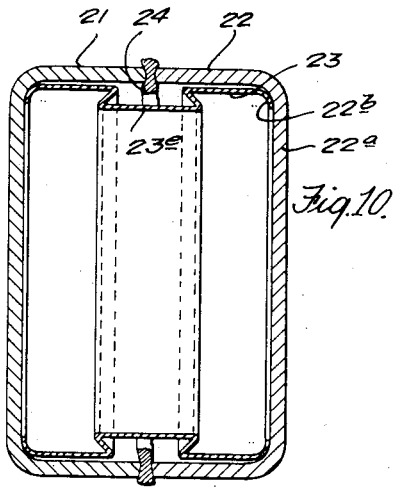
Fig. 10 is a longitudinal section of the same article after the weld has been effected.

In Figs. 9 and 10, there is illustrated a hollow article having end walls. In this article, the shield is provided to confine the burr that is extruded inwardly. The article is made up of two cup-shaped pieces 21 and 22 which are arranged for welding with the opened ends abutting as illustrated in Fig. 9. The end wall 21a of the cup-shaped piece 21 and the end wall 22a of the cup-shaped piece 22 form shoulders against which the ends of a shield 23 abut. The shield 23 consists of curved end flanges 23a and 23b, sections 23c and 23d which lie along the inner circumferential walls of the cup-shaped pieces 21 and 22 respectively and a central section 23e that is shaped as illustrated. The shield is preferably insulated from the cup-shaped pieces. The several parts are arranged in Fig. 9 in the position in which they are placed when about to be welded. The resulting article is illustrated in Fig. 10. From Fig. 10, it will be seen that the section 23e of the shield 23, upon the weld being effected, forms with the inner surface of the wall of the article a confined space in which the inwardly extending burr 24 is confined. It will also be noted that the end flange 23a and 23b abut against the curve at the end walls of the cup-shaped pieces.

Figure 11:
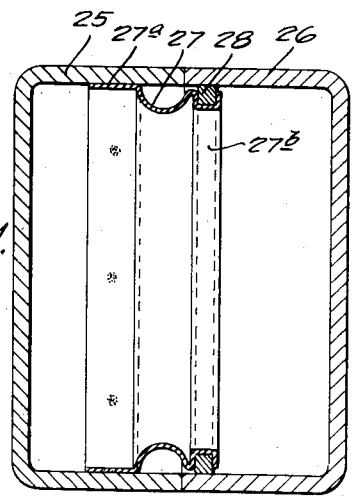
Fig. 11 is a longitudinal section of a similar hollow article ready for welding.
Figure 12:
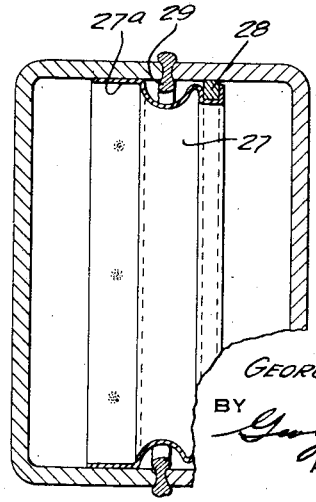
Fig. 12 is a longitudinal section of the same article after the weld has been effected.

A similar article has been illustrated in Figs. 11 and 12. The article illustrated in Figs. 11 and 12 is made up of two cup-shaped pieces 25 and 26. The shield 27 in this instance includes a flange 27a that is spot welded to the inner wall of the cup-shaped piece 25. The shield proper is curved as illustrated and has formed on the edge opposite to that from which the flange 27a extends a gasket-retaining channel 27b. Within the channel 27b there is secured a gasket 28 that engages the inner surface of the wall of the cup-shaped piece 26. The parts are arranged so that when the weld is effected, the inwardly extending burr will be centrally of the shield proper. This condition is illustrated in Fig. 12 in which the welded article is shown. The inwardly extending burr 29 is confined between the flange 27a and the gasket 28, the shield extending between the flange and the gasket.

In Figs. 13 and 14, there is illustrated fragmentary sections of a specially shaped hollow article. This hollow article is made up of two circular hollow pieces 30 and 31. As seen in Fig. 13, the piece 30, has an angle formation adjacent the joint so that there are two sections 30a and 30b arranged at an angle to each other. The part 31 has a similar angular formation the portions 31a and 31b having a more acute angle than the parts 30a and 30b of the part 30. A shield 32 is provided which includes a flange 32a that is arranged at an angle similar to the angle between the portions 30a and 30b of the piece 30. A flange 32b is also provided on the other side of the shield which is bent at an angle corresponding with the angles between the portions 31a and 31b of the piece 31. The parts are shown in Fig. 13 arranged and ready for welding. In Fig. 14 the parts are shown after the weld has been effected. From Fig. 14, it will be seen that the shield is wedged between the inclined shoulders formed by the angular relation of the portions of the pieces 30 and 31. This wedging action will take place as long as the angle is sufficiently acute to prevent slippage of the parts. The shield 32, as seen in Fig. 14, confines the burr 33 within a limited and closed space in the hollow article.

Two forms of confining the burr that is extruded when two flat plates are welded together are illustrated in Figs. 15 to 18. In the form illustrated in Fig. 15 there are two plates 34 and 35 abutting together and arranged for welding. To the plate 34 there is secured an abutment 36 that includes a flange 36a that is spot welded to the plate and an angularly disposed portion 36b that extends at an angle to the plate. To the plate 35 the shield 37 is secured. This particular shield consists of a flange 37a that is secured by spot welding to the plate 35. The shield proper includes two angularly disposed portions 37b and 37c arranged so that when the weld is effected a bulge will be formed to accommodate the extruded burr. The manner in which this occurs is illustrated in Fig. 16.

In Figs. 17 and 18 another form of shield is illustrated. Two plates 38 and 39 with their end edges in contact are illustrated in Fig. 16. To the plate 38 there is secured a piece of sheet metal which includes a flange 40a that extends along the plate and that is spot welded thereto, an upstanding portion 40b that extends substantially at right angles to the surface of the plate and an offset portion 40c that extends parallel to the surface of the plate and spaced therefrom. A similar piece of sheet metal is secured to the plate 39 and includes a flange 41a that is spot welded to the plate, a laterally extending portion 41b and an offset portion 41c that extends parallel to the plate and spaced therefrom. The portion 41b is longer than the portion 40b by at least the thickness of the metal so that when the weld is effected the portions 40c and 41c overlap as illustrated in Fig. 18, and form a closed pocket confining the burr.

In all of the shields described above, the shield is preformed for the purpose of providing a bulge that receives the burr as it is extruded during the welding operation, and in consequence, the abutments are arranged to provide for some movement or sliding. It is not, however, necessary to preform the shield in all instances. It may be desirable in some instances to have the burr, as it is extruded from the joint, form the bulge in the shield. An arrangement of this kind is illustrated in Figs. 19 and 20. In Fig. 19 there is illustrated two tubular pieces 42 and 43 arranged with the ends abutting together and ready for welding. In this arrangement abutments 44 and 45 are provided one secured to each of the pieces 42 and 43 respectively. Each of these abutments consists of a flange that is spot welded to the tubular piece and diverging portions extending from the flange. Between the abutments 44 and 45 there is placed a sheet metal ring 46. Upon the weld being effected the extruded metal 47, as illustrated in Fig. 20, forces the central part of the shield 46 inwardly. The ends of the shield are confined and wedged between the abutments. The extruded burr thus forms the pocket in which it is confined.

From the foregoing description of the several articles illustrated in the drawing, it will be apparent to those skilled in the art that by the invention herein disclosed there is provided a method for butt welding two pieces of metal together and confining the burr within a closed, limited space. The invention is applicable to produce any type of article which requires butt welding and provides a welded article in which there is no possibility of particles, which may become loosened from the burr, endangering any mechanism with which the article is used or contaminating another substance that may come in contact with the surface of the article. While those shields illustrated are thin, flexible, metallic shields formed from light material, it will be apparent that preformed shields of heavy material may be used and that the shields may well be made of any material not too easily burned or melted. In some applications porcelain, Bakelite or other like molded products might be used.

It will be obvious that various changes may be made by those skilled in the art in the steps of the method, as described above, and in the details of the several embodiments of the invention illustrated in the drawings and described in detail above within the principle and scope of the invention as expressed in the appended claims.

I claim:

1. The method of electric-resistance welding two pieces of metal together at the edges thereof to form a continuous wall and confining the burr and loose metallic particles resulting from the weld which method includes the steps of arranging the pieces to be welded to engage a closure element, arranging a sheet metal flexible closure element flexible in the plane of the weld across the joint and so as to avoid completing through the closure element an electrical circuit between the pieces to be welded, the closure element being positioned to engage the pieces upon the take-up as the weld is effected, electrically heating the adjoining edges of the pieces to be welded and upsetting the metal at the joint by moving the pieces together.

2. The method of electric-resistance welding two hollow pieces of metal together at the edge thereof to form a continuous wall and confining the burr and loose particles resulting from the weld, which method includes the steps of securing within one of the pieces a closure shield positioned to overlie the joint in the weld and spaced therefrom at the joint and an abutment within the other piece positioned to engage the end of the shield in a particle-tight closure upon the take-up as the weld is effected, electrically heating the adjacent ends of the pieces to be welded, and upsetting the metal at the joint by moving the pieces together.

3. The method of electric-resistance, butt-welding two pieces of metal together at the edges thereof to form a continuous wall and confining the burr and loose metallic particles resulting from the weld which method includes the steps of arranging a closure of relatively thin stiff material corresponding in outline to the shape of the ends of the pieces to be welded to traverse the joint and to effect a particle-tight closure with the wall of the welded piece on each side of the joint upon the take-up as the weld is effected, the closure having side sections arranged to effect a particle-tight engagement with the wall of the welded piece on each side of the joint and an intermediate section arranged to be spaced from the wall of the welded piece at the joint, electrically heating the ends of the pieces to be welded and moving the pieces together beyond the point of contact of the pieces, whereby the sheet metal closure element engages to form with the wall of the welded piece a particle-tight closure for the burr and loose metallic particles formed by upsetting the metal at the joint.

4. The method of electric-resistance, butt-welding two pieces of metal together at the edges thereof to form a continuous wall and confining the burr and loose metallic particles resulting from the weld which method includes the steps of arranging a closure element of relatively thin stiff material corresponding in outline to the shape of the ends of the pieces to be welded to traverse the joint and to effect a particle-tight closure across the joint upon the take-up as the weld is effected, the closure including side sections adapted to engage the wall of the welded piece in particle-tight engagement and an intermediate portion adapted to be spaced from the welded piece, electrically heating the ends of the pieces to be welded and moving the pieces together beyond the point of contact of the pieces, whereby the sheet metal closure element engages the wall of the welded piece on each side of the joint and is spaced from the wall at the joint and forms with the wall of the welded piece a particle-tight closure for the burr and loose metallic particles formed by upsetting the metal at the joint.

5. The method of electric-resistance, butt-welding two pieces of metal together at the edges thereof to form a continuous wall and confining the burr and loose metallic particles resulting from the weld, which method includes the steps of arranging one of the pieces adjacent the edge to be welded to retain a closure element, arranging a sheet metal closure having an outline corresponding to the shape of the ends of the pieces to be welded to traverse the joint, the closure having side sections positioned and adapted to engage in particle-tight engagement the wall of the welded piece on opposite sides of the joint and an intermediate portion adapted to be spaced from the wall of the welded piece, electrically heating the ends of the pieces to be welded and moving the pieces together beyond the point of contact of the pieces, whereby the ends of the closure element engage in particle-tight engagement with the wall of the welded piece on each side of the joint and the intermediate portion is spaced from the wall, the closure forming with the wall of the welded piece a particle-tight closure for the burr and loose metallic particles formed by upsetting the metal at the joint.

6. The method of electric-resistance, butt-welding two pieces of metal together at the edges thereof and confining the burr and loose metallic particles resulting from the weld, which method includes the steps of forming an abutment on each of the pieces adjacent the edge to be welded, the abutment extending the full length of the edge, arranging a sheet metal closure of an outline corresponding to the shape of the ends of the pieces to be welded and of greater width than the distance between the abutments in the welded piece to traverse the joint and between the abutments, the closure including side portions adapted to engage the abutments in particle-tight engagement and an intermediate portion adapted to be spaced from the wall of the welded piece, electrically heating the ends of the pieces to be welded, and moving the pieces together beyond the point of contact of the pieces, whereby the sheet metal closure element is forced into particle-tight engagement with the wall of the welded piece at the abutments and is spaced from the wall of the welded piece at the wall to provide with the wall of the welded piece a particle-tight chamber enclosing the burr and loose metallic particles.

7. The method of electric-resistance, butt-welding two pieces of metal together at the edges thereof to form a continuous wall and confining the burr and loose metallic particles resulting from the weld, which method includes the steps of securing an abutment to one of the pieces adjacent the end to be welded, the abutment extending the length of the edge, arranging a sheet metal closure element corresponding to the outline of the ends of the pieces to be welded to traverse the joint and engage the abutment and the surface of the other piece upon the take-up as the weld is effected, the width of the closure element being greater than the distance between its points of engagement with the wall of the welded piece, the closure element including side sections arranged to engage the wall of the welded piece in particle-tight engagement on each side of the joint and an intermediate section arranged to be spaced from the wall of the welded piece at the joint, electrically heating the ends of the pieces to be welded, and moving the pieces together beyond the point of contact of the pieces, whereby the sheet metal closure element engages in particle-tight contact with the wall of the welded piece on each side of the joint, is spaced from the wall of the welded piece at the joint and forms therewith a closed chamber for the burr and loose metallic particles formed by upsetting the metal at the joint.

8. The method of electric-resistance, butt-welding, two pieces of metal together and confining the burr and loose metallic particles resulting from the weld, which method includes the steps of securing an abutment having an inclined section to one of the pieces adjacent the end to be welded with the inclined section diverging from the wall of the piece towards the end to be joined, the abutment extending throughout the length of the edge of the piece to be welded, arranging a sheet metal closure element having an outline corresponding to the shape of the end to be welded to traverse the joint beneath the inclined portion of the abutment and engage the wall of the other piece in particle-tight engagement upon the take-up as the weld is effected, the closure element including side portions adapted to engage the wall of the welded piece and a central portion spaced from the welded piece, electrically heating the ends of the pieces to be welded, and moving the pieces together beyond the point of contact of the pieces, whereby the sheet metal closure element forms with the wall of the welded piece a particle-tight closure for the burr and loose metallic particles formed by upsetting the metal at the joint.

9. The method of electric-resistance butt-welding two pieces of metal together and confining the burr and loose metallic particles resulting from the weld which method includes the steps of securing an abutment having an inclined section to each of the pieces to be welded adjacent the end to be welded with the inclined portion diverging from the surface of the pieces towards the joint, each abutment extending throughout the length of the edge to be welded, arranging a sheet metal closure element having an outline corresponding to the edges of the pieces to be welded to traverse the joint, the sheet metal closure element being of a width greater than the distance between the abutments and arranged, so that the edges thereof are engaged beneath the abutments upon the take-up as the weld is effected, electrically heating the ends of the pieces to be welded, and moving the pieces together beyond the point of contact of the pieces, whereby the sheet metal closure element is engaged, beneath the diverging sections of the abutments and brought into particle-tight closure with the wall of the welded piece, to form a chamber for the burr and loose metallic particles formed by upsetting the metal at the joint.

10. A welded article of the type described, comprising a continuous wall including in combination two pieces of metal joined together at the edges by an ingraining of the metal of the pieces to an extent forming a burr at the joint, and a sheet metal closure element traversing the joint and enclosing the burr, the sheet metal element engaging the wall of the welded piece on each side of the joint in particle-tight engagement and spaced from the wall of the welded piece at the joint and forming therewith a housing for the burr and loose metallic particles.

11. A welded article of the type described comprising a continuous wall including in combination two pieces of metal butt-welded together at the edges by an ingraining of the metal at the joint to an extent to effect a burr, an abutment on each side of the joint and a sheet metal closure element consisting of a single piece of sheet metal traversing the joint, the sheet metal element engaging the wall of the welded piece in particle-tight engagement at the abutments and spaced from the wall of the welded piece at the joint.

12. A welded article of the type described, comprising a continuous wall including in combination two pieces of metal butt-welded together by effecting an ingraining of the metal of the pieces whereby a burr is formed at the joint, an abutment secured on each side of the joint and a sheet metal closure shield consisting of a single piece of sheet metal and in developed section of a width greater than the distance between the abutments traversing the joint, the closure shield being engaged by the abutments at the opposite side edges and secured thereby in particle-tight association with the wall of the article and spaced from the wall of the article at the joint.

13. A welded article of the type described comprising a continuous wall including in combination two pieces of metal butt-welded together by upsetting the metal at the joint, an abutment piece secured to the wall of the article on each side of the joint, and a sheet metal closure shield consisting of a single piece of sheet metal for confining the weld, the shield traversing the joint, being wedged in place between the abutments in particle-tight contact with the article and forming a particle-tight chamber with the welded piece.

14. A welded article of the type described comprising a continuous wall including in combination two pieces of metal butt-welded together by an ingraining of the metal whereby a burr is formed at the joint, an abutment secured at one side of the joint, a closure shield consisting of a single piece of sheet metal secured at the other side of the joint and wedged by the abutment into particle-tight contact with the article.

GEORGE H. PHELPS.